US 12,408,797 B2

United States Patent
Barfuss, Jr. et al.

(10) Patent No.: US 12,408,797 B2
(45) Date of Patent: Sep. 9, 2025

(54) STAND MIXER WITH LOCKING PLANETARY OUTPUT

(71) Applicant: WHIRLPOOL CORPORATION, Benton Harbor, MI (US)

(72) Inventors: Dan Christian Barfuss, Jr., St. Joseph, MI (US); Timothy E. Heater, Hartford, MI (US); Naveen Jayabalan, Stevensville, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 512 days.

(21) Appl. No.: 17/939,161

(22) Filed: Sep. 7, 2022

(65) Prior Publication Data

US 2024/0074617 A1 Mar. 7, 2024

(51) Int. Cl.
*A47J 43/08* (2006.01)
*A47J 43/044* (2006.01)
*A47J 43/07* (2006.01)

(52) U.S. Cl.
CPC ........ *A47J 43/082* (2013.01); *A47J 43/044* (2013.01); *A47J 43/0711* (2013.01); *A47J 2043/0449* (2013.01)

(58) Field of Classification Search
CPC ........ B01F 27/091; B01F 27/95; A47J 43/082
See application file for complete search history.

(56) References Cited

U.S. PATENT DOCUMENTS

| | | | |
|---|---|---|---|
| 1,872,004 A | 8/1932 | Rataiczak et al. | |
| 2,404,380 A * | 7/1946 | Jensen | A21C 1/02 475/11 |
| 2,938,715 A | 5/1960 | Farrell, Jr. | |
| 3,312,433 A | 4/1967 | Peterson | |
| 4,132,484 A | 1/1979 | Kimmel | |
| 4,311,397 A | 1/1982 | Wright | |
| 4,946,285 A | 8/1990 | Vennemeyer | |
| 6,932,503 B2 | 8/2005 | Fallowes | |
| 7,270,473 B2 | 9/2007 | Donthnier et al. | |
| 8,579,496 B2 | 11/2013 | Annis et al. | |
| 10,004,359 B2 | 6/2018 | Hoare et al. | |
| 10,098,505 B2 | 10/2018 | Roberts et al. | |
| D964,803 S | 9/2022 | McConnell et al. | |

(Continued)

FOREIGN PATENT DOCUMENTS

| | | | | |
|---|---|---|---|---|
| DE | 2312459 A1 | 5/1974 | | |
| FR | 569175 A * | 4/1924 | | A21C 1/02 |

(Continued)

*Primary Examiner* — Elizabeth Insler
(74) *Attorney, Agent, or Firm* — Price Heneveld LLP

(57) ABSTRACT

A stand mixer includes a motor output shaft and a locking planetary output. The locking planetary output has a center shaft operably connected with the output shaft for driven rotation about a fixed axis, an agitator shaft mounted to the center shaft such that the agitator shaft moves around the fixed axis of the center shaft in a planetary arrangement, and a planetary gear centrally arranged about the fixed axis of the center shaft. A gear unit is rotatably fixed on the agitator shaft and is slidably mounted therewith to be moveable between a first position, in which the gear unit is engaged with the planetary gear, and a second position in which the gear unit is disengaged from the planetary gear and is engaged with a locking member.

20 Claims, 6 Drawing Sheets

(56) References Cited

U.S. PATENT DOCUMENTS

| | | |
|---|---|---|
| 2010/0313701 A1 | 12/2010 | Lu |
| 2013/0033958 A1 | 2/2013 | Bravo |
| 2014/0050045 A1 | 2/2014 | Hoare et al. |
| 2018/0001283 A1 | 1/2018 | Altenritter et al. |

FOREIGN PATENT DOCUMENTS

| | | |
|---|---|---|
| IT | 201900001727 A1 | 8/2020 |
| JP | 3204638 B2 | 9/2001 |
| JP | 2016063788 A | 12/2018 |
| WO | 2022043708 A1 | 3/2022 |

\* cited by examiner

STAND MIXER WITH LOCKING PLANETARY OUTPUT

BACKGROUND OF THE DISCLOSURE

The present disclosure generally relates to a stand mixer, and more specifically, to a stand mixer with a locking planetary output for implementing a bowl-wiping mode.

Stand mixers are electronic appliances used for mixing ingredients. Typically, the stand mixer includes a bowl that is anchored or otherwise retained by the mixer. The mixer includes an output that is retained in a fixed position with respect to the bowl. Various mixing tools can be connected to the output for use in connection with various ingredients and desired results or purposes. Typically, mixers are configured to drive these tools in a planetary motion that involves rotating the selected tool about a moving axis that rotates about a central fixed axis (that often aligns with a center of the mixing bowl). This arrangement is used to develop more even incorporation of ingredients during mixing. In connection with certain ingredients or food products, such as batters, frosting, or the like that are generally viscous but do not tend to gather in a cohesive mass, the ingredients may adhere to the inside surface of the mixing bowl. While the planetary mixing motion can re-incorporate the ingredients by periodically removing them from the inside surface, such finished or in-process products are often left stuck to the inside wall at the end of a mixing operation. In this case, when the user completes mixing and removes the bowl, the user must wipe down the entire inside surface of the bowl to reclaim the mixed ingredients added to the bowl. More particularly, after a stand mixer completes the mixing chosen by the user, the user then needs to either raise the head of the mixer (in the case of tilt head mixers) or lower the mixer bowl (in the case of a "bowl lift" mixer) to allow for the mixing tool to be removed. The user can then remove the bowl from the mixer before removing the mixed ingredients from the bowl through the use of a spoon, spatula, or similar tool to wipe down the entire inner surface of the bowl, which consolidates the mixed ingredients into the next step of the baking/cooking process. To remove the contents of the bowl if the ingredients are uniformly distributed requires the bowl to be held up in a contents removal orientation for a prolonged period of time, adding work and strain to the user while the distributed mixing contents are wiped off from the bowl.

The current state of mixer function is to uniformly distribute the ingredients to achieve the best mixing performance. Oftentimes these ingredients require more time and effort on the part of the user to remove than if the mixed ingredients were consolidated within the bowl as much as possible before the user empties the bowl. Accordingly, further improvements may be desired.

SUMMARY OF THE DISCLOSURE

According to one aspect of the present disclosure, a stand mixer includes a drive motor having an output shaft operably associated therewith and a locking planetary output. The locking planetary output has a center shaft operably connected with the output shaft of the drive motor for driven rotation about a fixed axis, an agitator shaft mounted to the center shaft such that the agitator shaft moves around the fixed axis of the center shaft in a planetary arrangement, and a planetary gear centrally arranged about the fixed axis of the center shaft. A gear unit is rotatably fixed on the agitator shaft and is slidably mounted therewith to be moveable between a first position, in which the gear unit is engaged with the planetary gear to cause rotation of the agitator shaft about a moving axis thereof during movement of the agitator shaft around the fixed axis by the center shaft, and a second position in which the gear unit is disengaged from the planetary gear and is engaged with a locking member to maintain a rotational position of the agitator shaft about the moving axis thereof during movement of the agitator shaft around the fixed axis by the center shaft.

According to another aspect of the present disclosure, a stand mixer includes a mixing head having a housing, a stand supporting the mixing head above a work surface, a mixing bowl removably coupled with the stand and defining an inner side surface, a drive motor enclosed within the housing of the mixing head and having an output shaft operably associated therewith, and a locking planetary output mounted to the housing of the mixing head. The locking planetary output includes a center shaft operably connected with the output shaft of the drive motor for driven rotation about a fixed axis and an agitator shaft mounted to the center shaft such that the agitator shaft moves around the fixed axis of the center shaft in a planetary arrangement. The locking planetary output is configured to operate in a mixing mode, wherein the agitator shaft rotates about a moving axis thereof with rotation of the center shaft, and a wiping mode, wherein the agitator shaft is fixed about the moving axis during rotation of the center shaft. The stand mixer further includes a mixing element removably coupled with the agitator shaft. The mixing element includes a wiping edge in periodic contact with the inner side surface of the mixing bowl when the agitator shaft is operating in the mixing mode and in constant contact with the inner side surface when the agitator shaft is in the wiping mode.

According to yet another aspect of the present disclosure, a planetary output assembly for a stand mixer includes a center shaft configured for driven rotation about a fixed axis, a cover affixed on a free end of the center shaft, an agitator shaft mounted to the cover such that the agitator shaft moves around the fixed axis of the center shaft in a planetary arrangement during rotation thereof, a planetary gear centrally arranged about the fixed axis of the center shaft, and a gear unit rotatably fixed on the agitator shaft. The gear unit is slidably mounted to the agitator shaft to be moveable between a first position, in which the gear unit is engaged with the planetary gear to cause rotation of the agitator shaft about a moving axis thereof during movement of the agitator shaft around the fixed axis by the center shaft, and a second position in which the gear unit is disengaged from the planetary gear and is engaged with a locking member to maintain a rotational position of the agitator shaft about the moving axis thereof during movement of the agitator shaft around the fixed axis by the center shaft.

These and other features, advantages, and objects of the present disclosure will be further understood and appreciated by those skilled in the art by reference to the following specification, claims, and appended drawings.

Figure 1:
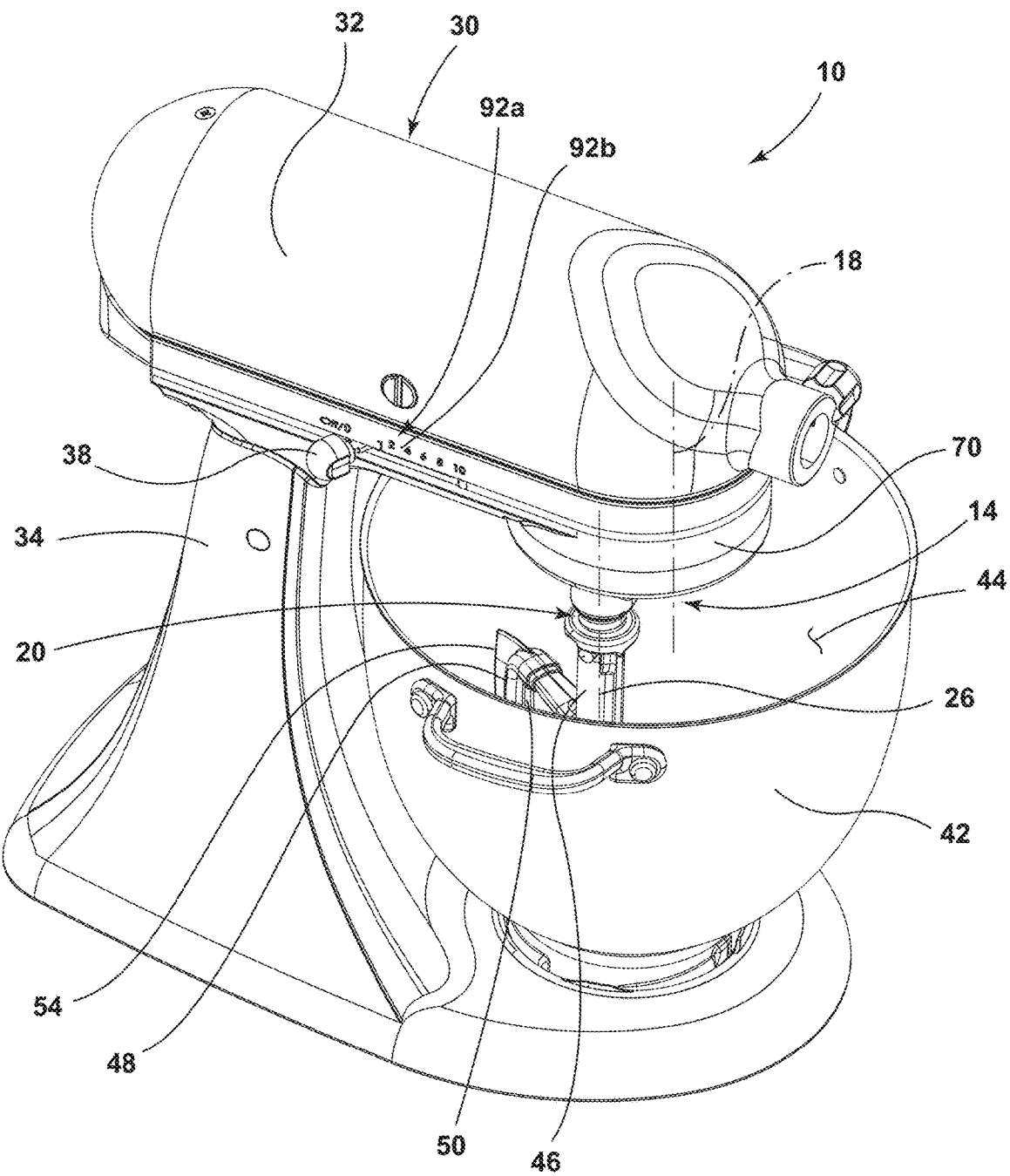
FIG. 1 is a perspective view of a stand mixer including a locking planetary output according to an aspect of the disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a stand mixer. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-8, reference numeral 10 generally designates a stand mixer 10. The stand mixer 10 includes a motor output shaft 12 (FIGS. 5 and 6) operably associated therewith and a locking planetary output 14. The locking planetary output 14 has a center shaft 16 operably connected with the motor output shaft 12 for driven rotation about a fixed axis 18. An agitator shaft 20 is mounted to the center shaft 16 such that the agitator shaft 20 moves around the fixed axis 18 of the center shaft 16 in a planetary arrangement. A planetary gear 22 is centrally arranged about the fixed axis 18 of the center shaft 16. A gear unit 24 is rotatably fixed on the agitator shaft 20 and is slidably mounted therewith to be moveable between a first position (FIG. 5), in which the gear unit 24 is engaged with the planetary gear 22 to cause rotation of the agitator shaft 20 about a moving axis 26 thereof during movement of the agitator shaft 20 around the fixed axis 18 by the center shaft 16, and a second position (FIG. 6) in which the gear unit 24 is disengaged from the planetary gear 22 and is engaged with a locking member 28 to maintain a rotational position of the agitator shaft 20 about the moving axis 26 thereof during movement of the agitator shaft 20 around the fixed axis 18 by the center shaft 16.

As shown in FIG. 1, the stand mixer 10 includes a mixing head 30 having a housing 32 connected to a stand 34 supporting the mixing head 30 above a work surface S. The housing 32 encloses a drive motor 36 (FIGS. 5 and 6) that includes the above-mentioned output shaft 12. In one example, the drive motor 36 can be a variable speed AC motor that can be controlled by a user via a sliding control knob 38 accessible on the exterior of the housing 32. In other examples, the drive motor 36 can be a DC motor, including a brushless DC motor that can be controlled digitally using an adaptation of the control knob 38 or using a digital interface. The output shaft 12 is operably coupled with the center shaft 16 by a pair of bevel gears 40a and 40b that translate the rotation from the horizontal axis of the output shaft 12 to the vertical fixed axis 18 of the central shaft 16. In this respect, the gears 40a and 40b can be further configured to provide a reduction mechanism to increase the torque realized in the planetary output assembly while reducing the rotational speed of the central shaft 16 compared to the output shaft 12. In other aspects, the rotational translation and/or reduction can be accomplished by a worm gear arrangement in place of the depicted bevel gears 40a and 40b.

Figure 2:
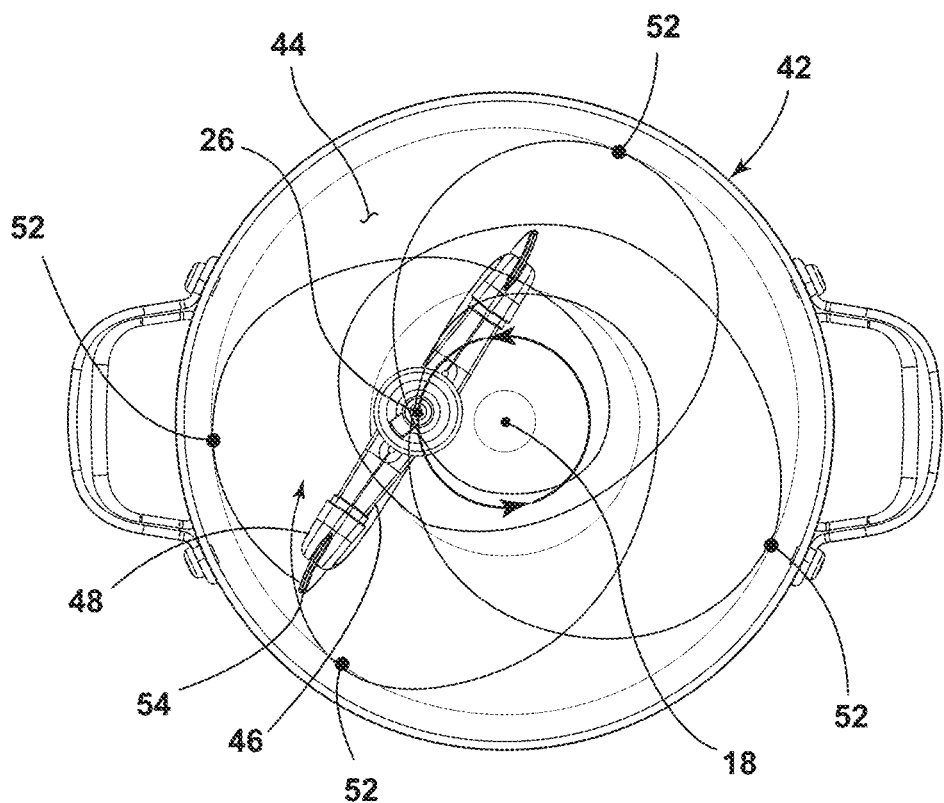
FIG. 2 is a top view of a mixing bowl with a mixing implement driven in a planetary motion in one operating mode of the stand mixer.
Figure 3:
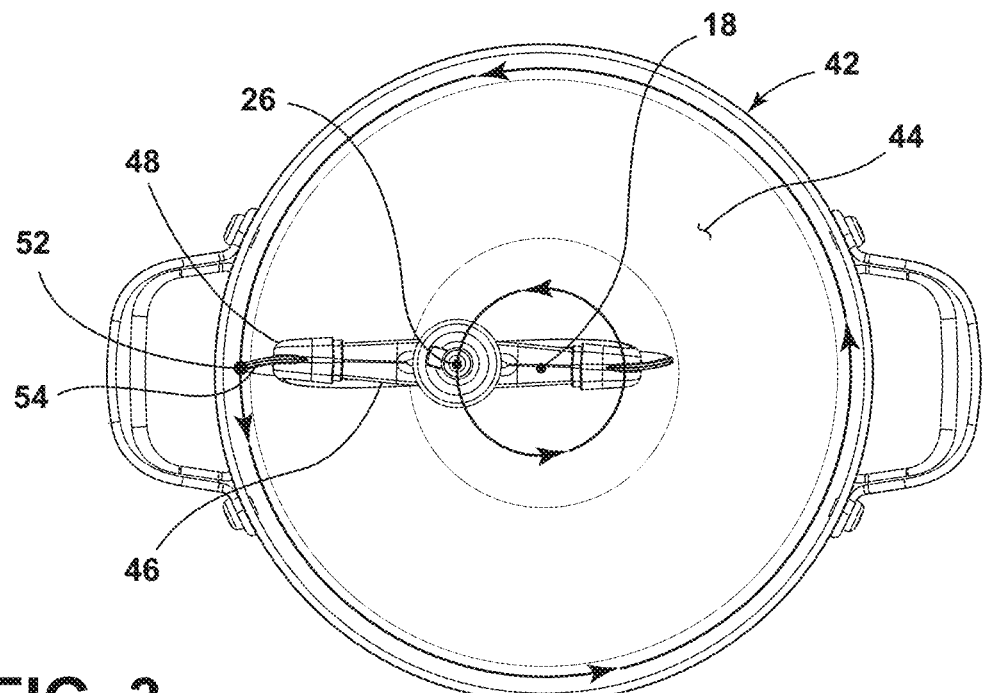
FIG. 3 is a top view of the mixing bowl with the mixing implement driven in a wiping motion in another operating mode of the stand mixer.

A mixing bowl 42 is removably coupled with the stand 34 and defines an inner side surface 44. Additionally, the stand mixer 10 includes a mixing element 46 that is removably coupled with the agitator shaft 20. In this manner, the stand mixer 10 is generally configured for driving the mixing element 46 in a planetary manner typical of stand mixers in general to mix or otherwise process ingredients contained in the mixing bowl 42. As shown, the mixing element 46 is shown as a beater attachment that may be used, in one aspect, to prepare batters, frostings, and other viscous food products that are intended to be thicker in consistency than items processed using a whisk, for example, while not settling into a cohesive mass, as would a dough, for example (which may be processed using a separate element in the form of a hook, for example). Significantly, such products, as well as some of their underlying ingredients during early mixing, tend to collect or adhere to the inner side surface 44 of the mixing bowl 42 during processing. Accordingly, beaters according to the specific type of mixing element 46 shown in the figures have been developed that include one or more flexible edge member 48. In the example shown the mixing element 46 includes two flexible edge members 48 on both side arms 50 (i.e., a "dual flex-edge" beater), although other variations include a flexible edge member 48 on only one side. A mixing element 46 with such flexible edge member(s) 48 not only provides the mixing functions provided by a typical beater tool, but it also wipes the inside surface 44 of the mixing bowl 42 by way of a flexibly deformable wiping edge 54 of the flexible edge member 48 making contact with the inside surface 44 at discrete touch points 52. As shown in FIG. 2, a typical planetary assembly (shown in the related art stand mixer M of FIG. 4) is such that the center shaft S rotates in a fixed location about an axis in a similar manner to the center shaft 16 of the present stand mixer 10, as discussed above. Notably, no implement connections are provided directly to the center shaft S. Instead, the center shaft S drives rotation of a cap that encloses the planetary assembly P. The agitator shaft A is rotatably mounted on the cap such that rotation of the center shaft S moves the agitator shaft A in an orbital manner around the center shaft S axis.

Figure 4:
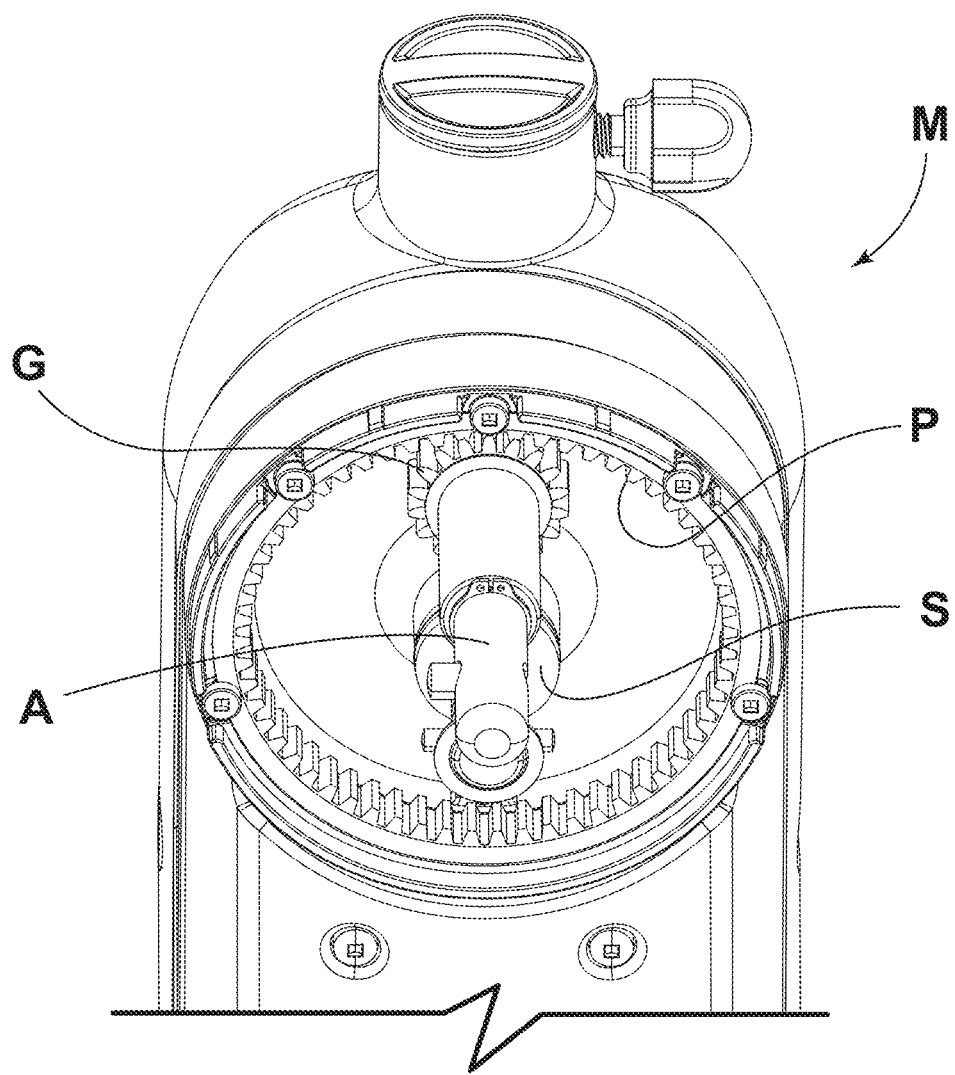
FIG. 4 is a bottom-perspective or a related-art mixer with a planetary gear arrangement.
Figure 5:
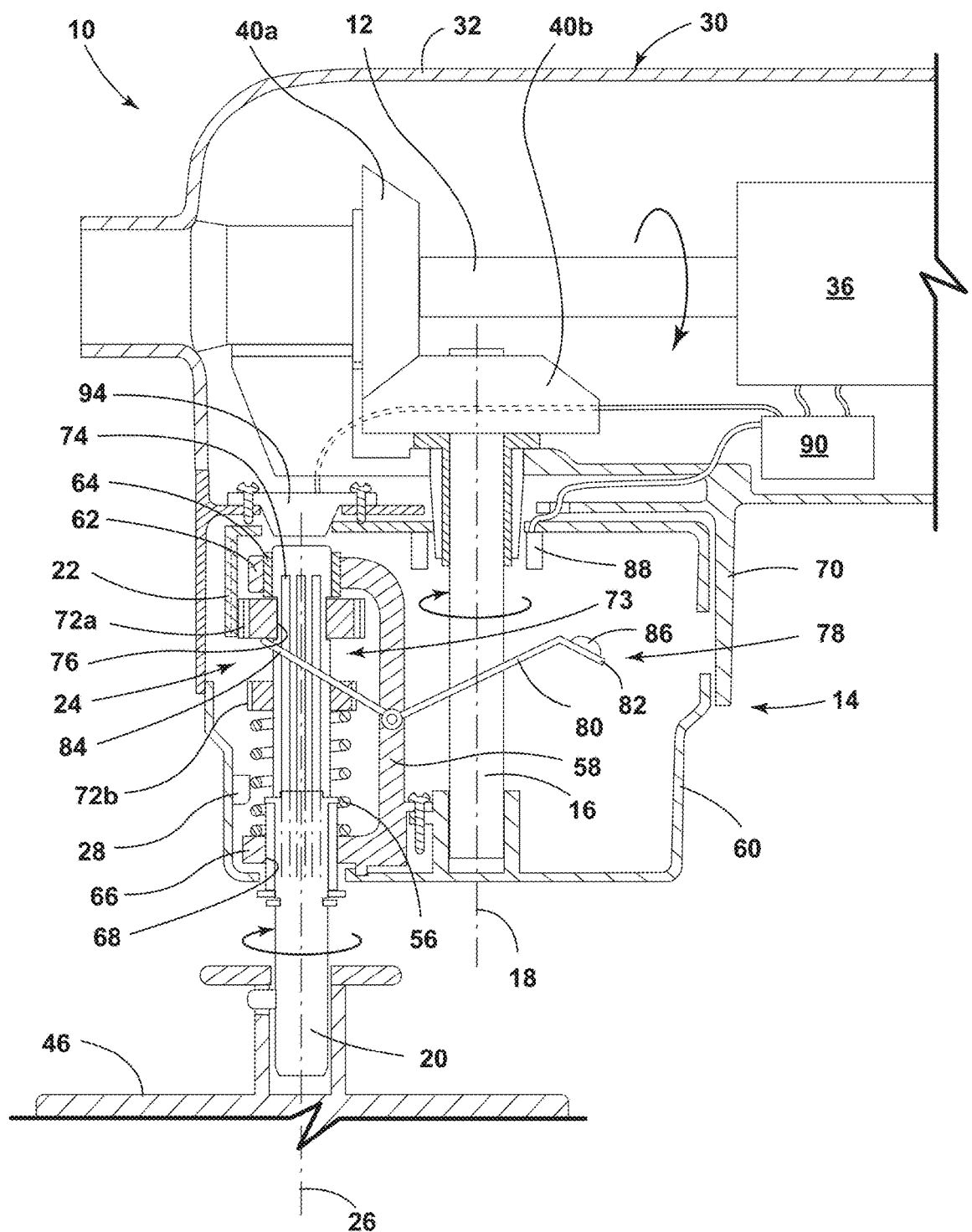
FIG. 5 is a cross-sectional view of the locking planetary output according to the disclosure in a first operating condition for implementing the planetary motion of FIG. 2.

As shown in FIG. 4, a gear G is rigidly affixed on the agitator shaft A and engages with a planetary gear P that is affixed on the mixer housing H and is centered about the center shaft S. In this manner, the orbital movement of the agitator shaft A about (and driven by the center shaft S) causes the gear G to rotate within the planetary gear P, which causes the agitator shaft A to rotate on its own axis as it orbits the center shaft S. In one aspect, the present stand mixer 10 is configured to operate in a similar manner by the above-mentioned positioning of the moveable gear unit 24 in the first position, wherein it is engaged with the planetary gear 22 (FIG. 5). Operation in this configuration results in movement of the mixing element 46 shown in FIG. 2, wherein the side arm 50 of the flex edge member 48 is only in periodic contact with the inside surface 44 of the mixing bowl 42. Notably, although the contact is indicated by the depicted touch points 52, the flexible nature of the side arm 50 results in more prolonged contact with the inside surface 44 approaching and passing the touch points 52 to arrive at the described "wiping" of the inside surface 44. In this manner, the use of either a single flex edge beater tool or the depicted double flex edge beater tool 48 improves incorporation of ingredients by wiping the area surrounding the touch points 52 around the inside surface 44 of the mixing bowl 42, by removing ingredients from the inside surface 44 that tend to cling thereto during mixing. The planetary motion shown in FIG. 2 is asynchronous such that the rotation of the agitator shaft 20 about the moving axis 26 does not match the orbital rotation of the agitator shaft 20 about the fixed axis 18, which results in the touch points 52 covering different areas of the inside surface 44 with successive rotations of the center shaft 16. However, this motion may leave ingredients stuck to the inside surface 44 when the mixer 10 is turned off, as ingredients may re-stick to areas previously wiped with the flexible edge member 48 on previous orbits of the agitator shaft 20. The mixed ingredients are typically distributed all-around the mixer bowl. Accordingly, the use of the depicted mixing element 46 does not prevent, possibly, a considerable amount of mixed ingredients being left in contact with the inside surface 44 when mixing (or an intermediate mixing step) is complete (as shown, for example, in FIG. 7). Accordingly, in the case of the described related art mixer M, when the user completes mixing and removes the bowl, the user must wipe down the entire inside surface 44 of the bowl to reclaim the mixed ingredients added to the bowl.

Figure 6:
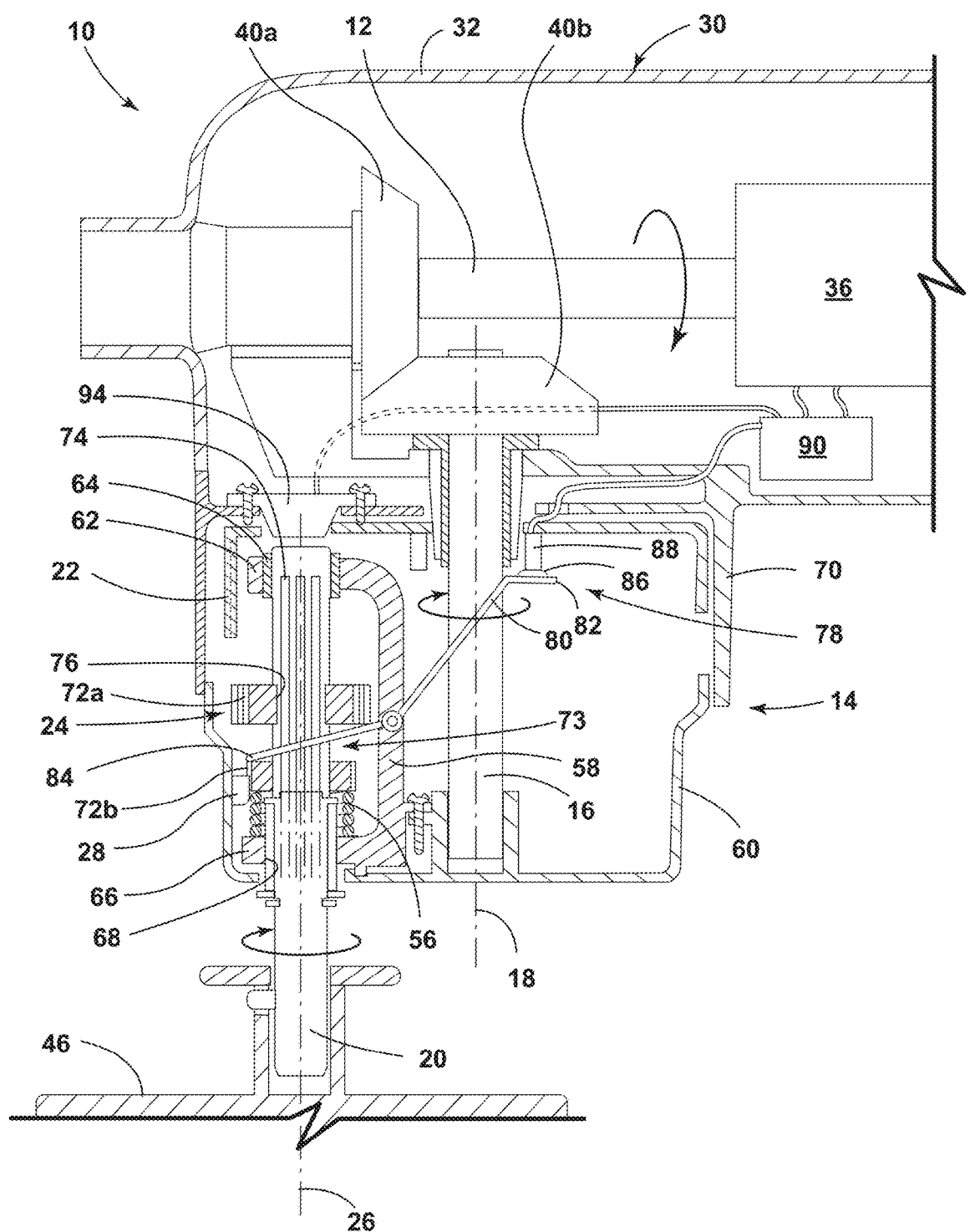
FIG. 6 is a cross-sectional view of the locking planetary output according to the disclosure in a second operating condition for implementing the wiping motion of FIG. 3.

The present mixer 10, in addition to providing a "mixing" mode corresponding to the positioning of the gear unit 24 in the first position shown in FIG. 5 and resulting in the periodic wiping along discrete touch points 52 shown in FIG. 2, provides a "wiping" mode corresponding with the positioning of the gear unit 24 in the above-described second position shown in FIG. 6. In this manner, after completion of a mixing operation, the stand mixer 10 can be reconfigured into the wiping mode to fix the position of the agitator shaft 20 about its moving axis 26 before causing rotation of the center shaft 16, which results in the mixing element 46 rotating about the fixed axis 18 offset on the moving axis 26. By configuring the stand mixer 10 to reconfigure into the wiping mode when the mixing element 46 is in a touch point 52 position, shown in FIG. 3, driven rotation of the center shaft 16 moves a wiping edge 54 along the inside surface 44 in consistent contact therewith to effectively wipe the entire portion of the inside surface 44 with which the wiping edge 54 makes contact. This configuration of the stand mixer 10 can significantly reduce the effort needed by the user to remove the mixed ingredients from the mixing bowl 42 by using the flex edge mixing element 46 to wipe the bowl through a full 360-degree motion (or more, if needed). This may simplify the removal of mixed ingredients from the stand mixer bowl 42 and may provide additional benefits during intermediate mixing stages, where the user wishes to gather the in-process ingredients or otherwise remove them from the inside surface 44 of the mixing bowl 42.

With particular attention to FIGS. 5 and 6, the present locking planetary output assembly 14 is described in greater detail. As shown, the stand mixer 10 includes the above-mentioned mixing head 30 with the housing 32 enclosing the drive motor 36 and with which the locking planetary output 14 is mounted. Stand 34 supports the mixing head 30 above the work surface S and retains the mixing bowl 42. The above-described mixing element 46 is removably coupled with the agitator shaft 20 to extend into the mixing bowl 42, as discussed above. The locking planetary output 14 is shown in FIG. 5 in the above-mentioned first position, in which the planetary output assembly 14 is configured to operate in the mixing mode, wherein the agitator shaft 20 rotates about moving axis 26 with rotation of the center shaft 16 about the fixed axis 18. More particularly, the gear unit 24 is urged upward into the first position thereof by the force of a spring 56 that is positioned between the gear unit 24 and a support arm 58 on which the agitator shaft 20 is mounted. In this manner, the gear unit 24 engages in a mesh arrangement with the planetary gear 22, which is arranged about and concentrically with the fixed axis 18 of the center shaft 16. This configuration results in the planetary output assembly 14 operating to move the mixing element 46 in the planetary manner discussed above and shown in FIG. 2, wherein the wiping edge 54 of the mixing element 46 is in periodic contact (corresponding with the movement of the edge 54 past the touch points 52) with the inner side surface 44 of the mixing bowl 42.

As further shown, the planetary output assembly 14 includes a cover 60 mounted with a free end 62 of the center shaft 16. The agitator shaft 20 can be mounted to the cover 60 by way of the support arm 58 being coupled on an interior of the cover 60. The illustrated support arm 58 includes a first end 62 supporting a first bearing 64 coupled with the agitator shaft 20 on a first (lower) side of the gear unit 24 and a second end 66 supporting a second bearing 68 on a second (upper) side of the gear unit 24 opposite the first side. In one aspect, the support arm 58 is sized to accommodate movement of the gear unit 24 between the first (FIG. 5) and second (FIG. 6) positions. Additionally, the support arm 58 is configured to provide sufficient support for the agitator shaft 20 to prevent undesired eccentric movement thereof (and of the mixing element 46) and to maintain the gear unit 24 in sufficient contact with the planetary gear 22 when the gear unit 24 is in the depicted first configuration. As shown, the cover 60 interacts with a lower flange 70 on the housing 32 to enclose the planetary output assembly 14.

In an embodiment, the gear unit 24 can consist of two external spur gears 72a and 72b. The first spur gear 72a and the second spur gear 72b can be fixedly coupled together in a unitary implementation of the gear unit 24 in which a channel 73 is defined between the first and second spur gears 72a and 72b. As shown in FIG. 5, the first spur gear 72a is positioned on an upper side of the gear unit 24 and is sized to engage with the planetary gear 22 when the gear unit 24 is in the first configuration. The illustrated arrangement of the gear unit 24 may be useful for the gear unit 24 to fit within the cover 60, while maintaining similar proportions to an existing stand mixer 10 or to otherwise operate as described herein. As discussed above, the gear unit 24 is rotationally fixed on the agitator shaft 20 but is slideable along the moving axis 26 associated with the agitator shaft 20. In particular, the agitator shaft 20 can be configured with external splines 74 extending along the axis 26 (and extending either inwardly or outwardly on the agitator shaft 20) that engage with and/or receive internal splines 76 on the interior of the gear unit 24. In this arrangement, the agitator shaft 20 is configured for being driven in the planetary rotation motion discussed above by way of the planetary gear 22 and the locking arrangement with respect to the locking member 28, discussed further below. Under operation in the mixing mode, the spring 56 will force the gear unit 24 upward to the first position (FIG. 5), to provide the planetary movement of the mixing element 46, discussed above, under rotation of the center shaft 16.

The locking planetary output 14 further includes an electromechanical actuator 78 to cause movement of the gear unit 24 between the depicted first position and the second position shown in FIG. 6. One implementation, the electromechanical actuator 78 can be as shown in FIGS. 5 and 6, in which the planetary output 14 includes a lever 80 that engages the channel 73 of the gear unit 24. As shown in FIG. 5, the lever 80 freely allows the spring 56 to urge the gear unit 24 into the first position, engaged with the planetary gear 22. Turning to FIG. 6, the electromechanical actuator 78 can be activated to cause the lever 80 to rotate by upward movement of a free end 82, which results in a second end 84 moving downward, by way of the rotating attachment of the lever 80 with the support arm 58. This movement forces the gear unit 24 downward against the force of the spring 56 by way of the engagement of the second end 84 with the channel 73 in the gear unit 24. This moves the first spur gear 72a out of engagement with the planetary gear 22. Continued operation of the actuator 78 causes further downward movement of the gear unit 24 such that the second spur gear 72b moves into engagement with the locking member 28. As discussed above, the locking member 28 is fixed with respect to the center shaft 16, including by coupling with either the cover 60, as shown, or with the support arm 58. In one aspect, the locking member 28 can be a single gear tooth or a set of, for example, between two and five gear teeth sized for engagement with the second spur gear 72b to restrain movement of the agitator shaft 20 to rotation about the center shaft 16. As discussed above, this rotationally locks the mixing element 46 with respect to the center shaft 16. In various aspects, the teeth of the second spur gear 72b can have beveled or pointed lower surfaces to allow for the gear unit 24 to move into proper alignment with the locking member 28 (which can be correspondingly shaped) with movement of the gear unit 24 into the second position.

To effect movement of the lever 80, as described above, the electromechanical actuator 78 can include a magnetic element 86 on the free end 82 thereof and an electromagnetic element 88 positioned, as shown, within the flange 70 of the housing 32. In this manner, the electromagnetic element 88 can be selectively activated to attract the magnetic element 86 on the free end 82 of the lever 80 to cause the above-described rotation of the lever 80 to move the gear unit 24 from the first position to the second position. In one aspect, the lever 80 can define a forked shape on either or both of the ends 82 and 84 such that the end 84 can reliably engage with the channel 73 and so that the magnetic element 86 can be attracted by and maintain contact (or close proximity with) with the electromagnetic element 88, when activated. In further respects, the magnetic element 86 can be a permanent magnet, such as those comprising neodymium, iron boron (NdFeB), samarium cobalt (SmCo), alnico, and ceramic or ferrite magnets. The electromagnet can be a typical electromagnet construction, including an iron core with a wire wrapping, and in particular, can be arranged as a ring-shaped structure generally surrounding the center shaft 16 around an exit point thereof through the housing 32. The arrangement of the permanent magnet 86 and the electromagnet 88 can be configured to provide sufficient force to compress spring 56 to cause downward movement of the gear unit 24.

As illustrated, the stand mixer 10 can include a controller 90 to selectively activate and deactivate the electromagnet 88 to cause movement of the lever 80, as described above. As can be appreciated, the activation and deactivation of the electromagnet 88 can be effected by directly, or through controlled operation of a switch or other electromechanical circuit, starting and stopping an electrical current flow through the electromagnetic coils. The particular current flow can be controlled or calibrated to achieve the desired responsiveness of the related system. Additionally, the controller 90 can be configured to receive a user input corresponding with a command to change the operating condition of the planetary output 14, including reconfiguration between the mixing mode and the wiping mode, as described herein. In various respects the input can be in the form of a particular position of the lever 80, including a position 92a below the lowest speed operational setting 92b or, in a specific implementation of the planetary output 14, a reverse setting. In other aspects, the user input can be received through a pushbutton that may operate electromechanically or digitally. In connection with receipt of the selection of the wiping mode by the user, the controller 90 can be configured to identify when the edge 54 of the flex edge member 48 is at the touch point 52 (or close enough thereto to effect sufficient wiping of the inside surface 44, such as within 0.5" of the touch point 52, for example).

In the illustrated example, the planetary output 14 includes a sensor 94 positioned adjacent the agitator shaft 20 within the housing 32. The sensor 94 can be used to identify when the agitator shaft 20 is oriented in a position that corresponds with the mixing element 46 touch points 52. In this manner, the mixing element 46 can be configured to couple with the agitator shaft 20 in a single orientation (such as by the depicted bayonet-style fitting shown in FIG. 1) such that a specific positioning of the agitator shaft 20 can indicate corresponding positioning of the mixing element 46 in a touch-point orientation. In one aspect, the agitator shaft 20 can include a marker, either magnetic, electronic, or optical, that can be detected by a corresponding variation of the sensor 94 to indicate the desired positioning of the agitator shaft 20. Alternatively, the controller 90 can be configured to identify a mixing element 46 touch-point condition by monitoring the current drawn by the motor 36 during operation. Notably, the motor 36 draws more current when the mixing element 46 is at or moving through the touch points 52 due to the increased resistance resulting from contact of the edges 54 with the inside surface 44. To implement this mode of detection, the controller 90 can be configured for electronic communication with the motor 36 and for monitoring an operating current of the motor 36 and determining a current level associated with the locking planetary output 14 moving the wiping edge 54 into contact with the inside surface 44. In one aspect, this configuration may allow the mixer 10 to utilize either edge 54 of a dual flex-edge beater according to the depicted mixing element 46, as a position sensor may be only associated with one edge to maintain compatibility with a single flex-edge variation.

Figure 7:
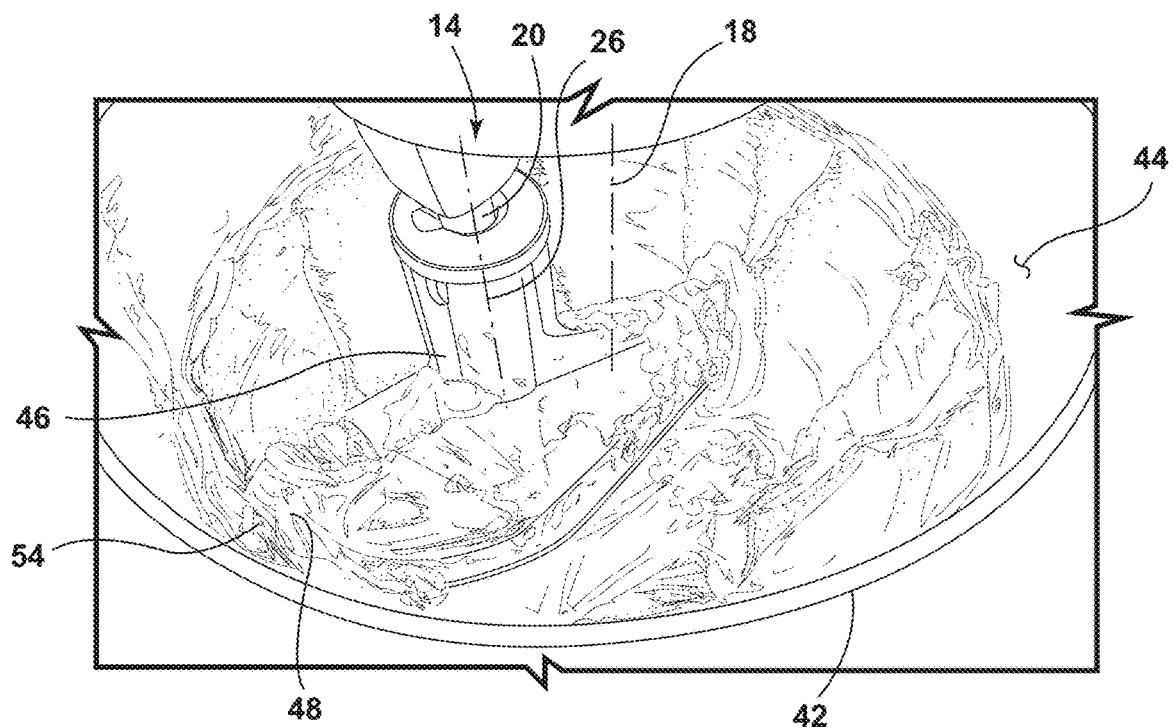
FIGS. 7 and 8 are depictions of the mixer moving the mixing implement in a wiping motion within the mixing bowl.
Figure 8:
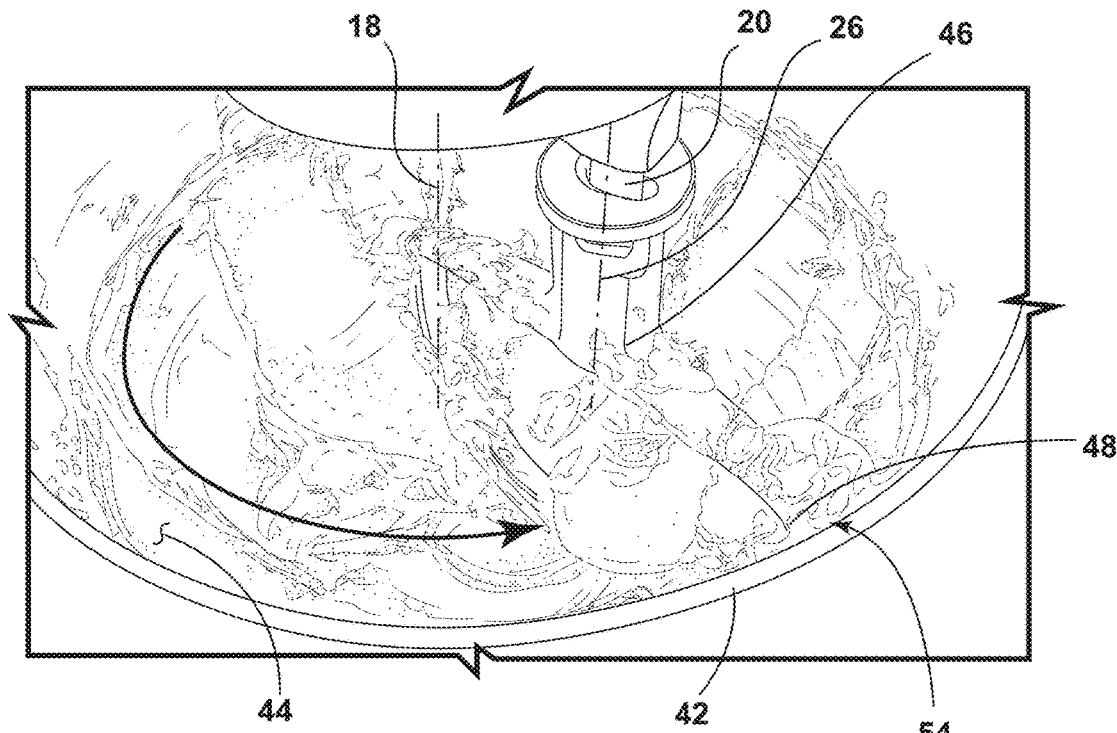

In either of the configurations discussed above, the controller 90 can receive the available user inputs and operate accordingly. In one example, the user can initially select a mixing mode by moving the lever 80 to a particular speed setting for the mixer 10, which can cause operation of the mixer 10 in the above-described mixing mode. When desired, the user can select to change operation to the above-described wiping mode. The controller 90 can receive this input and continue an operation corresponding with the selection (e.g. low speed operation or reversing) while monitoring for a touch-point condition, as discussed above. Upon detecting a touch point condition, the controller 90 can cause the electromechanical actuator 78 to move the gear unit 24 into the second configuration of FIG. 6 to configure the planetary output 14 in the wiping mode (this can, optionally include the controller 90 pausing movement of the motor 36 to maintain the desired positioning of the mixing element 46 during shifting). The mixer 10 can then execute a wiping operation in which the wiping edge 54 moves along the inside surface 44 of the mixing bowl 42, as shown in FIGS. 7 and 8. In one aspect, the wiping movement can continue until the user turns the mixer 10 into an "off" condition or selects another operating mode. In other implementations, the operation of the mixer 10 in the wiping mode can be controlled by the controller 90 such that the center shaft 16 is turned by a predetermined amount (e.g. 340°, 360° or 390°) before deactivating with the option for the user to activate an additional wiping operation.

In further variations of the locking planetary output assembly 14 discussed herein, the gear unit 24 can be moveable by a variation of the depicted lever 80 that is manually operable by the user. In various aspects, the lever 80 can be extended to be accessible on the exterior of the cover 60 of the planetary assembly 14 or can be connected with a sliding or rotating linkage member associated with the center shaft 16 that extends outward from the flange 70 of the housing 32 of the mixing head 30 (or elsewhere from the housing 32). In these variations, the mixer 10 can be switchable into a low speed mode intended to allow the user sufficient time to visually determine that the wiping edge 54 is at sufficiently close to a touch point 52 and manipulate the lever 80 (by whichever mechanism is used) to change the operation of the planetary output assembly 14 to the wiping mode.

The invention disclosed herein is further summarized in the following paragraphs and is further characterized by combinations of any and all of the various aspects described therein.

According to another aspect of the present disclosure, a stand mixer includes a drive motor having an output shaft operably associated therewith and a locking planetary output. The locking planetary output has a center shaft operably connected with the output shaft of the drive motor for driven rotation about a fixed axis, an agitator shaft mounted to the center shaft such that the agitator shaft moves around the fixed axis of the center shaft in a planetary arrangement, and a planetary gear centrally arranged about the fixed axis of the center shaft. A gear unit is rotatably fixed on the agitator shaft and is slidably mounted therewith to be moveable between a first position, in which the gear unit is engaged with the planetary gear to cause rotation of the agitator shaft about a moving axis thereof during movement of the agitator shaft around the fixed axis by the center shaft, and a second position in which the gear unit is disengaged from the planetary gear and is engaged with a locking member to maintain a rotational position of the agitator shaft about the moving axis thereof during movement of the agitator shaft around the fixed axis by the center shaft.

The stand mixer described in ¶ [0034] may further include a mixing head enclosing the drive motor and with which the locking planetary output is mounted, a stand supporting the mixing head above a work surface, a mixing bowl removably coupled with the stand and defining an inner side surface, and a mixing element removably coupled with the agitator shaft. The mixing element can include a wiping edge in periodic contact with the inner side surface of the mixing bowl when the gear unit is in the first position and in constant contact with the inner side surface when the gear unit is in the second position.

In the stand mixer described in ¶ [0035], the locking planetary output may further include an electromechanical actuator to cause movement of the gear unit between the first position and the second position, and the stand mixer may further include a controller configured to determine when the wiping edge is in contact with the inside surface of the mixing bowl when the gear unit is in the first position and to cause the actuator to move the gear unit in the second position in response to the wiping edge being in contact with the inside surface of the mixing bowl.

In the stand mixer described in ¶ [0036], the locking planetary output may further include a position sensor operably associated between the central shaft and the agitator shaft and configured to indicate a predetermined rotational position of the agitator shaft relative to the central shaft, and the mixing element can be removably coupled with the agitator shaft with the wiping edge in a fixed position relative to the position sensor such that the predetermined rotational position corresponds with a position of the mixing element in contact with the inside surface.

In the stand mixer described in ¶ [0036], the controller can be further in electronic communication with the motor and configured for monitoring an operating current of the motor and determining a current level associated with the locking planetary output moving the wiping edge into contact with the inside surface.

In the stand mixer described in any of ¶¶ to [0039], the controller can be configured to execute a bowl wiping function including determining when the wiping edge is in contact with the inside surface and causing the actuator to move the gear unit between the first position and the second position upon input from a user.

In the stand mixer described in any of ¶¶ to [0039], the electromechanical actuator can include a lever operably engaged with the gear unit at a first end of the lever and having a magnetic element at a second end thereof and an electromagnetic element selectively activated to attract the magnetic element on the second end of the lever to move the gear unit from the first position to the second position.

In the stand mixer described in any of ¶¶ to [0040], the gear unit can be spring-biased into the first position.

In the stand mixer described in any of ¶¶ to [0041], the locking planetary output may further include a support arm including a first end supporting a first bearing coupled with the agitator shaft on a first side of the gear unit and a second end supporting a second bearing on a second side of the gear unit opposite the first side, the support arm being sized to accommodate movement of the gear unit between the first and second positions and being rigidly coupled with the center shaft.

In the stand mixer described in any of ¶¶ to [0043], the gear unit can include a first spur gear and a second spur gear fixedly coupled together, the first spur gear being sized to engage with the planetary gear and the second spur gear being sized to engage the locking element.

According to yet another aspect, a stand mixer includes a mixing head having a housing, a stand supporting the mixing head above a work surface, a mixing bowl removably coupled with the stand and defining an inner side surface, a drive motor enclosed within the housing of the mixing head and having an output shaft operably associated therewith, and a locking planetary output mounted to the housing of the mixing head. The locking planetary output includes a center shaft operably connected with the output shaft of the drive motor for driven rotation about a fixed axis and an agitator shaft mounted to the center shaft such that the agitator shaft moves around the fixed axis of the center shaft in a planetary arrangement. The locking planetary output is configured to operate in a mixing mode, wherein the agitator shaft rotates about a moving axis thereof with rotation of the center shaft, and a wiping mode, wherein the agitator shaft is fixed about the moving axis during rotation of the center shaft. The stand mixer further includes a mixing element removably coupled with the agitator shaft. The mixing element includes a wiping edge in periodic contact with the inner side surface of the mixing bowl when the agitator shaft is operating in the mixing mode and in constant contact with the inner side surface when the agitator shaft is in the wiping mode.

In the stand mixer described in ¶ [0044], the locking planetary output can further include a planetary gear centrally arranged about the fixed axis of the center shaft and a gear unit rotatably fixed on the agitator shaft and slidably mounted therewith to be moveable between a first position, corresponding with the mixing mode and in which the gear unit is engaged with the planetary gear to cause rotation of the agitator shaft about the moving axis thereof during movement of the agitator shaft around the fixed axis by the center shaft, and a second position, corresponding with the wiping mode and in which the gear unit is disengaged from the planetary gear and is engaged with a locking member to maintain a rotational position of the agitator shaft about the moving axis thereof during movement of the agitator shaft around the fixed axis by the center shaft.

In the stand mixer described in ¶ [0045], the locking planetary output can further include an electromechanical actuator to cause movement of the gear unit between the first position and the second position, and the stand mixer can further include a controller configured to determine when the wiping edge is in contact with the inside surface of the mixing bowl when the gear unit is in the first position and to cause the actuator to move the gear unit in the second position in response to the wiping edge being in contact with the inside surface of the mixing bowl.

In the stand mixer described in ¶ [0046], the controller can be configured to execute a bowl wiping function including determining when the wiping edge is in contact with the inside surface and causing the actuator to move the gear unit between the first position and the second position upon input from a user.

In the stand mixer described in either of ¶¶ or [0047], the electromechanical actuator can include a lever operably engaged with the gear unit at a first end of the lever and having a magnetic element at a second end thereof and an electromagnetic element selectively activated to attract the magnetic element on the second end of the lever to move the gear unit from the first position to the second position.

In the stand mixer described in any of ¶¶ to [0047], the gear unit can be spring-biased into the first position.

In the stand mixer described in any of ¶¶ to [0049], the locking planetary output can further include a support arm including a first end supporting a first bearing coupled with the agitator shaft on a first side of the gear unit and a second end supporting a second bearing on a second side of the gear unit opposite the first side, the support arm being sized to accommodate movement of the gear unit between the first and second positions and being rigidly coupled with the center shaft.

In the stand mixer described in any of ¶¶ to [0050], the gear unit can include a first spur gear and a second spur gear fixedly coupled together, the first spur gear sized to engage with the planetary gear and the second spur gear sized to engage the locking element.

In the stand mixer described in any of ¶¶ to [0051], the locking planetary output can further include a position sensor operably associated between the central shaft and the agitator shaft and configured to indicate a predetermined rotational position of the agitator shaft relative to the central shaft, and the mixing element can be removably coupled with the agitator shaft with the wiping edge in a fixed position relative to the position sensor such that the predetermined rotational position corresponds with a position of the mixing element in contact with the inside surface.

According to yet another aspect, a planetary output assembly for a stand mixer includes a center shaft configured for driven rotation about a fixed axis, a cover affixed on a free end of the center shaft, an agitator shaft mounted to the cover such that the agitator shaft moves around the fixed axis of the center shaft in a planetary arrangement during rotation thereof, a planetary gear centrally arranged about the fixed axis of the center shaft, and a gear unit rotatably fixed on the agitator shaft. The gear unit is slidably mounted to the agitator shaft to be moveable between a first position, in which the gear unit is engaged with the planetary gear to cause rotation of the agitator shaft about a moving axis thereof during movement of the agitator shaft around the fixed axis by the center shaft, and a second position in which the gear unit is disengaged from the planetary gear and is engaged with a locking member to maintain a rotational position of the agitator shaft about the moving axis thereof during movement of the agitator shaft around the fixed axis by the center shaft.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A stand mixer, comprising:
   a drive motor having an output shaft operably associated therewith; and
   a locking planetary output, including:
      a center shaft operably connected with the output shaft of the drive motor for driven rotation about a fixed axis;
      an agitator shaft mounted to the center shaft such that the agitator shaft moves around the fixed axis of the center shaft in a planetary arrangement;
      a planetary gear centrally arranged about the fixed axis of the center shaft; and
      a gear unit rotatably fixed on the agitator shaft and slidably mounted therewith to be moveable between a first position, in which the gear unit is engaged with the planetary gear to cause rotation of the agitator shaft about a moving axis thereof during movement of the agitator shaft around the fixed axis by the center shaft, and a second position in which the gear unit is disengaged from the planetary gear and is engaged with a locking member to maintain a predetermined rotational position of the agitator shaft about the moving axis thereof during movement of the agitator shaft around the fixed axis by the center shaft.

2. The stand mixer of claim 1, further comprising:
   a mixing head enclosing the drive motor and with which the locking planetary output is mounted;
   a stand supporting the mixing head above a work surface;
   a mixing bowl removably coupled with the stand and defining an inside surface; and
   a mixing element removably coupled with the agitator shaft, the mixing element including a wiping edge in periodic contact with the inside surface of the mixing bowl when the gear unit is in the first position and in constant contact with the inner side surface when the gear unit is in the second position.

3. The stand mixer of claim 2, wherein the locking planetary output further includes an electromechanical actuator to cause movement of the gear unit between the first position and the second position, the stand mixer further including:
   a controller configured to determine when the wiping edge is in contact with the inside surface of the mixing bowl when the gear unit is in the first position and to cause the actuator to move the gear unit in the second position in response to the wiping edge being in contact with the inside surface of the mixing bowl.

4. The stand mixer of claim 3, wherein:
   the locking planetary output further includes a position sensor operably associated between the center shaft and the agitator shaft and configured to indicate a predetermined rotational position of the agitator shaft relative to the center shaft; and
   the mixing element is removably coupled with the agitator shaft with the wiping edge in a fixed position relative to the position sensor such that the predetermined rotational position corresponds with a position of the mixing element in contact with the inside surface.

5. The stand mixer of claim 3, wherein the controller is further in electronic communication with the motor and configured for monitoring an operating current of the motor and determining a current level associated with the locking planetary output moving the wiping edge into contact with the inside surface.

6. The stand mixer of claim 3, wherein the controller is configured to execute a bowl wiping function including determining when the wiping edge is in contact with the inside surface and causing the actuator to move the gear unit between the first position and the second position upon input from a user.

7. The stand mixer of claim 3, wherein the electromechanical actuator includes:
   a lever operably engaged with the gear unit at a first end of the lever and having a magnetic element at a second end thereof; and
   an electromagnetic element selectively activated to attract the magnetic element on the second end of the lever to move the gear unit from the first position to the second position.

8. The stand mixer of claim 1, wherein the gear unit is spring-biased into the first position.

9. The stand mixer of claim 1, wherein the locking planetary output further includes a support arm including a first end supporting a first bearing coupled with the agitator shaft on a first side of the gear unit and a second end supporting a second bearing on a second side of the gear unit opposite the first side, the support arm being sized to accommodate movement of the gear unit between the first and second positions and being rigidly coupled with the center shaft.

10. The stand mixer of claim 1, wherein the gear unit includes a first spur gear and a second spur gear fixedly coupled together, the first spur gear sized to engage with the planetary gear and the second spur gear sized to engage the locking member.

11. A stand mixer, comprising:
a mixing head having a housing;
a stand supporting the mixing head above a work surface;
a mixing bowl removably coupled with the stand and defining an inner side surface;
a drive motor enclosed within the housing of the mixing head and having an output shaft operably associated therewith;
a locking planetary output mounted to the housing of the mixing head and including:
a center shaft operably connected with the output shaft of the drive motor for driven rotation about a fixed axis; and
an agitator shaft mounted to the center shaft such that the agitator shaft moves around the fixed axis of the center shaft in a planetary arrangement, the locking planetary output being configured to operate in a mixing mode wherein the agitator shaft rotates about a moving axis thereof with rotation of the center shaft and a wiping mode wherein the agitator shaft is fixed about the moving axis during rotation of the center shaft; and
a mixing element removably coupled with the agitator shaft, the mixing element including a wiping edge in periodic contact with the inner side surface of the mixing bowl when the agitator shaft is operating in the mixing mode and in constant contact with the inner side surface when the agitator shaft is in the wiping mode.

12. The stand mixer of claim 11, wherein the locking planetary output further includes:
a planetary gear centrally arranged about the fixed axis of the center shaft; and
a gear unit rotatably fixed on the agitator shaft and slidably mounted therewith to be moveable between a first position, corresponding with the mixing mode and in which the gear unit is engaged with the planetary gear to cause rotation of the agitator shaft about the moving axis thereof during movement of the agitator shaft around the fixed axis by the center shaft, and a second position, corresponding with the wiping mode and in which the gear unit is disengaged from the planetary gear and is engaged with a locking member to maintain a predetermined rotational position of the agitator shaft about the moving axis thereof during movement of the agitator shaft around the fixed axis by the center shaft.

13. The stand mixer of claim 12, wherein the locking planetary output further includes an electromechanical actuator to cause movement of the gear unit between the first position and the second position, the stand mixer further including:
a controller configured to determine when the wiping edge is in contact with the inside surface of the mixing bowl when the gear unit is in the first position and to cause the actuator to move the gear unit in the second position in response to the wiping edge being in contact with the inside surface of the mixing bowl.

14. The stand mixer of claim 13, wherein the controller is configured to execute a bowl wiping function including determining when the wiping edge is in contact with the inside surface and causing the actuator to move the gear unit between the first position and the second position upon input from a user.

15. The stand mixer of claim 14, wherein the electromechanical actuator includes:
a lever operably engaged with the gear unit at a first end of the lever and having a magnetic element at a second end thereof; and
an electromagnetic element selectively activated to attract the magnetic element on the second end of the lever to move the gear unit from the first position to the second position.

16. The stand mixer of claim 13, wherein the gear unit is spring-biased into the first position.

17. The stand mixer of claim 13, wherein the locking planetary output further includes a support arm including a first end supporting a first bearing coupled with the agitator shaft on a first side of the gear unit and a second end supporting a second bearing on a second side of the gear unit opposite the first side, the support arm being sized to accommodate movement of the gear unit between the first and second positions and being rigidly coupled with the center shaft.

18. The stand mixer of claim 13, wherein the gear unit includes a first spur gear and a second spur gear fixedly coupled together, the first spur gear sized to engage with the planetary gear and the second spur gear sized to engage the locking member.

19. The stand mixer of claim 12, wherein:
the locking planetary output further includes a position sensor operably associated between the center shaft and the agitator shaft and configured to indicate a predetermined rotational position of the agitator shaft relative to the center shaft; and
the mixing element is removably coupled with the agitator shaft with the wiping edge in a fixed position relative to the position sensor such that the predetermined rotational position corresponds with a position of the mixing element in contact with the inside surface.

20. A planetary output assembly for a stand mixer, comprising:
a center shaft configured for driven rotation about a fixed axis;
a cover affixed on a free end of the center shaft;
an agitator shaft mounted to the cover such that the agitator shaft moves around the fixed axis of the center shaft in a planetary arrangement during rotation thereof;
a planetary gear centrally arranged about the fixed axis of the center shaft; and
a gear unit rotatably fixed on the agitator shaft and slidably mounted therewith to be moveable between a first position, in which the gear unit is engaged with the planetary gear to cause rotation of the agitator shaft about a moving axis thereof during movement of the agitator shaft around the fixed axis by the center shaft, and a second position in which the gear unit is disengaged from the planetary gear and is engaged with a locking member to maintain a predetermined rotational position of the agitator shaft about the moving axis thereof during movement of the agitator shaft around the fixed axis by the center shaft.

* * * * *